US008939674B2

(12) United States Patent
Zimmer et al.

(10) Patent No.: US 8,939,674 B2
(45) Date of Patent: Jan. 27, 2015

(54) SYSTEM AND METHOD FOR ASSEMBLING BLOW MOLDED PARTS WITHOUT USE OF FASTENERS

(75) Inventors: Ronald A. Zimmer, Dewitt, IA (US); Alan W. Knapper, McCausland, IA (US)

(73) Assignee: Custom-Pak, Inc., Clinton, IA (US)

( * ) Notice: Subject to any disclaimer, the term of this patent is extended or adjusted under 35 U.S.C. 154(b) by 252 days.

(21) Appl. No.: 13/338,426

(22) Filed: Dec. 28, 2011

(65) Prior Publication Data

US 2013/0167351 A1 Jul. 4, 2013

(51) Int. Cl.
*A63H 33/08* (2006.01)

(52) U.S. Cl.
USPC .............. 403/326; 403/14; 446/116; 446/121

(58) Field of Classification Search
CPC .......... F16B 5/0016; F16B 5/07; F16B 12/26; F16B 12/38; A63H 33/008; A63H 33/044; A63H 33/062
USPC ....................... 403/263, 326, 329, 11, 13, 14; 24/593.1, 596.1; 312/111, 140, 263, 312/265.5; 52/79.9; 446/116, 120, 121, 124
See application file for complete search history.

(56) References Cited

U.S. PATENT DOCUMENTS

| | | | | |
|---|---|---|---|---|
| 3,313,587 A * | 4/1967 | Mongesku et al. | ........... | 312/263 |
| 3,667,153 A * | 6/1972 | Christiansen | ................. | 446/124 |
| 3,674,295 A | 7/1972 | Padovani | | |
| 3,902,628 A * | 9/1975 | Schurman | ..................... | 220/835 |
| 4,021,089 A * | 5/1977 | Bush | .......................... | 312/265.5 |
| 4,082,220 A * | 4/1978 | Cheng et al. | ................. | 238/10 F |
| 4,203,548 A * | 5/1980 | Cheng | .......................... | 238/10 F |
| 4,266,882 A * | 5/1981 | Wilhelmi et al. | ............... | 403/14 |
| 4,359,948 A * | 11/1982 | Judy et al. | ..................... | 108/56.1 |
| 4,416,040 A * | 11/1983 | Towsley | ........................ | 403/361 |
| 4,514,104 A * | 4/1985 | Taylor et al. | .................... | 403/14 |
| 4,976,567 A * | 12/1990 | Spier | ............................. | 403/231 |
| 5,135,823 A | 8/1992 | Eales | | |
| 5,222,902 A * | 6/1993 | Piersch | ........................ | 446/121 |
| 5,405,080 A * | 4/1995 | Yeung et al. | .................. | 446/121 |
| 5,417,167 A | 5/1995 | Sadr | | |
| 5,736,170 A | 4/1998 | Stoner | | |
| 5,971,651 A * | 10/1999 | Gornick et al. | ................. | 403/14 |
| 6,325,962 B1 | 12/2001 | Kmiecik et al. | | |
| 6,557,191 B2 | 5/2003 | Bellows et al. | | |
| 6,938,558 B1 | 9/2005 | Peres | | |
| 7,066,553 B2 | 6/2006 | Maloney | | |
| 7,155,865 B2 * | 1/2007 | Rosenberg | ..................... | 52/79.9 |
| 7,234,780 B2 | 6/2007 | Lipniarski | | |
| 7,721,907 B2 * | 5/2010 | Keung | .......................... | 220/324 |
| 7,797,885 B2 * | 9/2010 | Mower et al. | .................. | 52/79.6 |
| 8,448,582 B2 * | 5/2013 | Jian | ............................... | 108/56.3 |
| 2009/0115222 A1 | 5/2009 | Hohnl et al. | | |
| 2010/0044152 A1 | 2/2010 | Lipniarski | | |

\* cited by examiner

*Primary Examiner* — Michael P Ferguson
(74) *Attorney, Agent, or Firm* — St. Onge Steward Johnston & Reens LLC

(57) ABSTRACT

System and method for assembling blow molded parts without the use of separate fasteners, including a tab-and-slot or dovetail mortise and tenon joint that includes a slide-and-lock tab feature. A retention barb on the tab slides along a ramp to engage with a receptacle within the slot. Tabs and slots can have varying widths to create mutual incompatibility with other joint components that are otherwise similarly constructed. An optional stopper on the tab and corresponding notch within the slot can add an additional axis of incompatibility with other joints throughout the assembly. These features prevent incorrect assembly and allow convenient redesigns.

30 Claims, 9 Drawing Sheets

SYSTEM AND METHOD FOR ASSEMBLING BLOW MOLDED PARTS WITHOUT USE OF FASTENERS

FIELD OF THE INVENTION

The present invention relates to systems and methods for assembling blow molded parts. More specifically, the invention relates to a system and method of assembling blow molded parts without the use of separate fasteners.

BACKGROUND OF THE INVENTION

The use of blow-molded parts for assembling various sorts of articles is generally well known.

U.S. Pat. No. 6,557,191 to Bellows ("Bellows") discloses a bed frame including a headboard, a foot board, a right side rail, and a left side rail. Each side rail has a first member and a corresponding second member. Each of the first and second members can be releasably attached to the headboard and the footboard respectively solely by mating end joint members formed in the first and second members and in the headboard and the foot board. Also, each of the first and second members can be releasably attached to each other solely by mating side joint members formed in the first and second members. The end and side joint members are mated through dovetail joints, pin-in-socket joints, or combinations thereof. The bed frame components can be blow-molded. However, Bellows does not provide multiple mechanisms for ensuring mutual incompatibility between joints having otherwise identical structures.

U.S. Pat. No. 7,234,780 to Lipniarski ("Lipniarski I") discloses a blow-molded braced stool having a seat, legs and a brace having an insertion side and an exit side. The brace has openings for receiving the legs. The seat has indented female connectors on a leg side of the seat. The legs are formed with male connectors. During the assembly, the male connectors on the legs are moved through the openings in the brace and into the female connectors in the seat. Lipniarski I also discloses that different blow-molded structures, such as a table, a bar, a book shelf or a storage surface, can be made using the same female-male connectors. However, Lipniarski I does not provide multiple mechanisms for ensuring mutual incompatibility between joints having otherwise identical structures.

U.S. Patent Appl. No. 2010/0044152 to Lipniarski ("Lipniarski II") discloses a blow-molded ladder assembly including a plurality of molded plastic parts which can be assembled by interfitting connections. The interfitting connections comprise a male interconnection that securely fits inside a female opening. However, Lipniarski II does not provide multiple mechanisms for ensuring mutual incompatibility between joints having otherwise identical structures.

U.S. Pat. No. 7,066,553 to Maloney ("Maloney") discloses a slat furniture structure having a pair of laterally spaced apart supports and slats disposed between the supports. The slats are connected to the supports by a snap fitting connection consisting of resilient U-shaped fingers that fit into recesses in the supports. However, Maloney does not provide any mechanism for ensuring that a particular part can only be connected to a particular counterpart, and does not provide multiple mechanisms for ensuring mutual incompatibility between joints having otherwise identical structures. Further, Maloney includes delicate barb structures.

U.S. Pat. No. 6,938,558 to Peres ("Peres") discloses a two-part blow molded pallet including slats that lock onto support stringers by a sliding, dovetail arrangement. The slats are formed by blow molding and have a plurality of dovetail slots to attach to stringers. However, Peres does not provide any mechanism for ensuring that a particular part can only be connected to a particular counterpart, and does not provide multiple mechanisms for ensuring mutual incompatibility between joints having otherwise identical structures. In addition, there is no structure to ease the abrupt change in pressure caused by the wedging action of the locking barbs during assembly.

U.S. Pat. No. 5,417,167 to Sadr ("Sadr") discloses a plastic pallet with stringers and deck boards made of a thin-walled hollow construction by blow molding or continuous extrusion. The stringers and deck boards can be connected together by interaction between locking barbs and slots and wedge configurations molded into the stringer and deck boards. However, Sadr does not provide any mechanism for ensuring that a particular part can only be connected to a particular counterpart, and does not provide multiple mechanisms for ensuring mutual incompatibility between joints having otherwise identical structures. Further, Sadr depends on the opposing force of other components to maintain the connection between two blow molded parts. In addition, there is no structure to ease the abrupt change in pressure caused by the wedging action of the locking barbs during assembly.

The cited prior art references generally disclose blow-molded assemblies that are connected by various interfitting male-female connectors. However, the references do not disclose a system and method for assembling blow molded parts that provides multiple mechanisms for ensuring mutual incompatibility between joints having otherwise identical structures. In particular, the references do not disclose a system and method which utilizes varied positioning for the slide-locks on female parts and corresponding male parts with different lock barb positions or a stop feature that prevents engagement with any female other than the mate to facilitate error-free assembly of multiple fasteners.

What is desired therefore is a system and method for connecting blow molded parts without the use of separate fasteners that addresses these deficiencies.

SUMMARY OF THE INVENTION

Accordingly, objects of the invention are to provide a system and method for connecting blow molded parts without the use of separate fasteners. Further objects of the invention are to provide a system and method for connecting blow molded parts in such a way as to provide ease of assembly and reliable connections, for preventing incorrect assembly of the parts, as well as facilitating ease of manufacturing, including standardization of joint mechanical properties and simple retooling to facilitate and simplify design changes. Other objects of the invention are to allow parts to be added to the design easily by modifying only the combinations of components within a joint without mechanically redesigning the joint.

These and other objectives are achieved by providing a slide-lock joint system and method for connecting blow molded parts where a slot having a receptacle is provided on a first part, and a tab having a barb is provided on a second part. A ramp is provided disposed within the slot. The ramp, barb, and receptacle are offset from the side of the slot by an arbitrary distance. When the tab is inserted into the slot, the barb slides up the ramp and engages the receptacle.

Further objects are achieved by providing a toy assembly comprising blow molded parts assembled using the slide-lock joint system and method.

These and other objects of the invention and its particular features and advantages will become more apparent from consideration of the following drawings and accompanying detailed description.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. For example, it is understood that corners and edges depicted as squared may also be radiused or chamfered without departing from the spirit of the invention.

Figure 1:
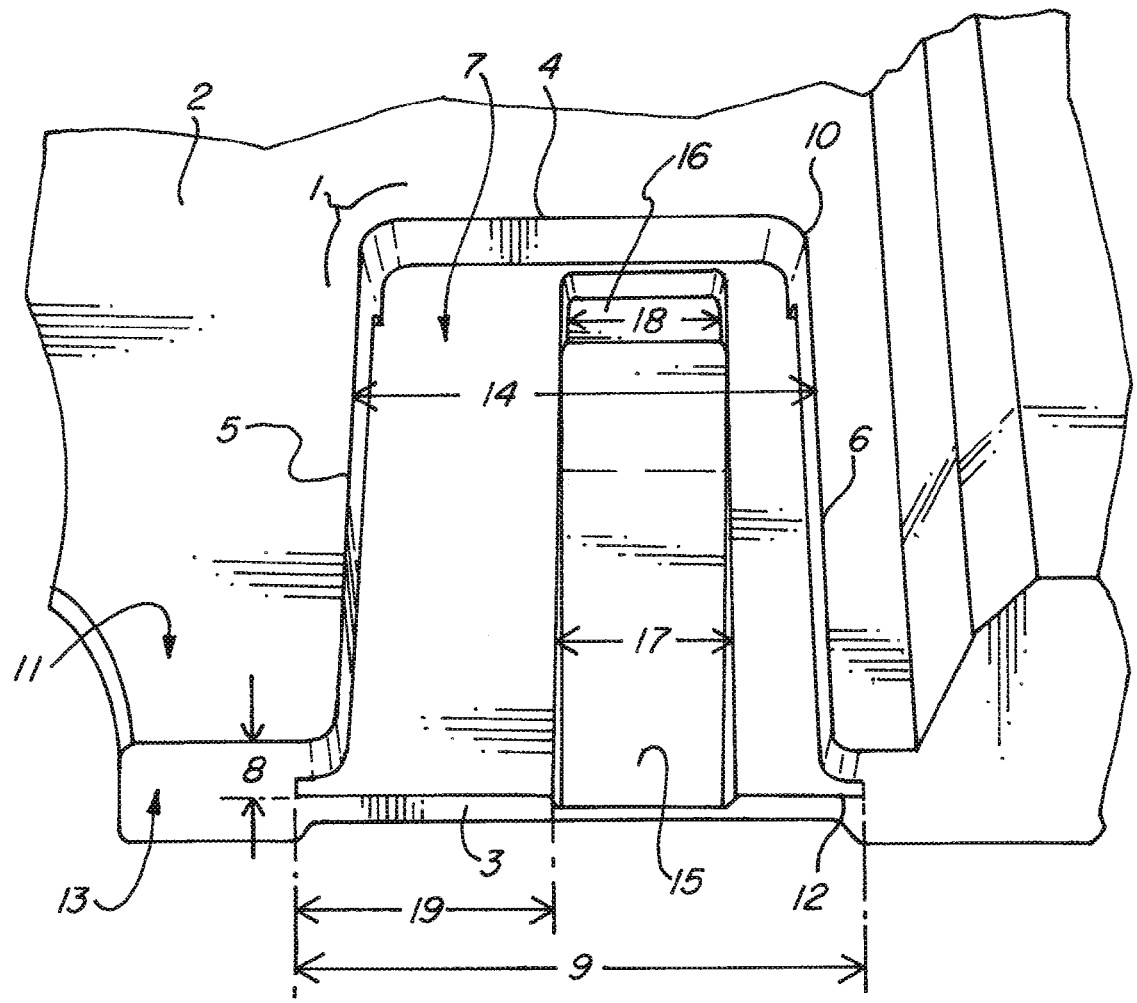
FIG. 1 is a top view of a female joint element according to aspects of the invention.

FIG. 1 illustrates a view of a female element 1 of a slide-and-lock joint according to aspects of the invention. Female element 1 is disposed on blow molded part 2. Female element 1 includes a front edge 3, back edge 4, left edge 5 and right edge 6, as well as a bottom surface 7. Bottom surface 7 is situated at a depth 8 below the outer surface of blow molded part 2. Bottom surface 7 has a bottom surface width 9 that is equal to the distance between left edge 5 and right edge 6 at bottom surface 7. Female element 1 has a top opening 10 in a top surface 11 of blow molded part 2, and a side opening 12 in a side surface 13 of blow molded part 2. Top opening 10 has a top opening width 14. The dimensions of female element 1 are such that an area of bottom surface 7 is greater than an area of top opening 10, and such that female element 1 describes a modified dovetail mortise in general shape, and serves this function mechanically.

Ramp 15 and receptacle 16 are disposed in bottom surface 7. Ramp 15 is beveled or tapered and has a ramp width 17. Receptacle 12 has a receptacle width 18. Receptacle width 18 can be equal to or related to ramp width 17. Ramp 15 is disposed in bottom surface 7 such that it extends from front edge 3 toward back edge 4, gradually shallowing to the depth of bottom surface 7 prior to reaching back edge 4. Receptacle 16 is aligned with ramp 15 such that the shallow end of ramp 15 is adjacent to receptacle 16, and such that receptacle 16 is at least partially disposed between ramp 15 and back edge 4. Receptacle 16 has a depth from the top surface 11 that is deeper than depth 8.

Receptacle width 18 and ramp width 17 are both less than bottom surface width 9. An offset distance 19 is defined between left edge 5 and ramp 15. Offset distance 19, ramp width 17, and receptacle width 18 can be varied among several instantiations of female element 1 either disposed on blow molded part 2 or disposed on other parts of an overall assembly of blow molded parts (not shown) while maintaining all other dimensions of female element 1. This can have the advantage of ensuring exclusive compatibility with a specific male counterpart (not shown) while maintaining substantially the same or similar mechanical characteristics of the dovetail joint among the various instantiations (not shown).

Figure 2:
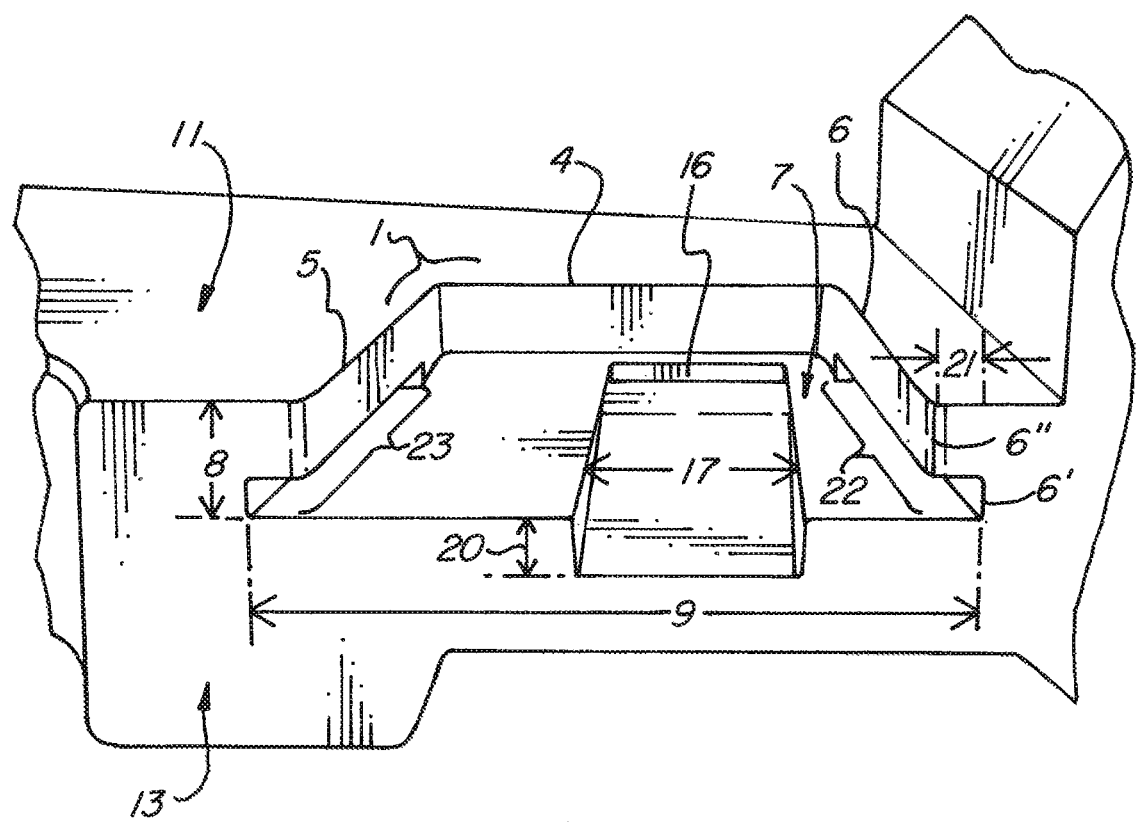
FIG. 2 is a partial side view of a female joint element according to aspects of the invention.

FIG. 2 illustrates a view of female element 1. Maximum ramp depth 20 is measured below bottom surface 7. Undercut depth 21 is the distance between right edge 6' measured at bottom surface 7, and right edge 6" measured at top surface 11. Undercut 22 is disposed in right edge 6 and an analogous undercut 23 is disposed in left edge 5.

Figure 3:
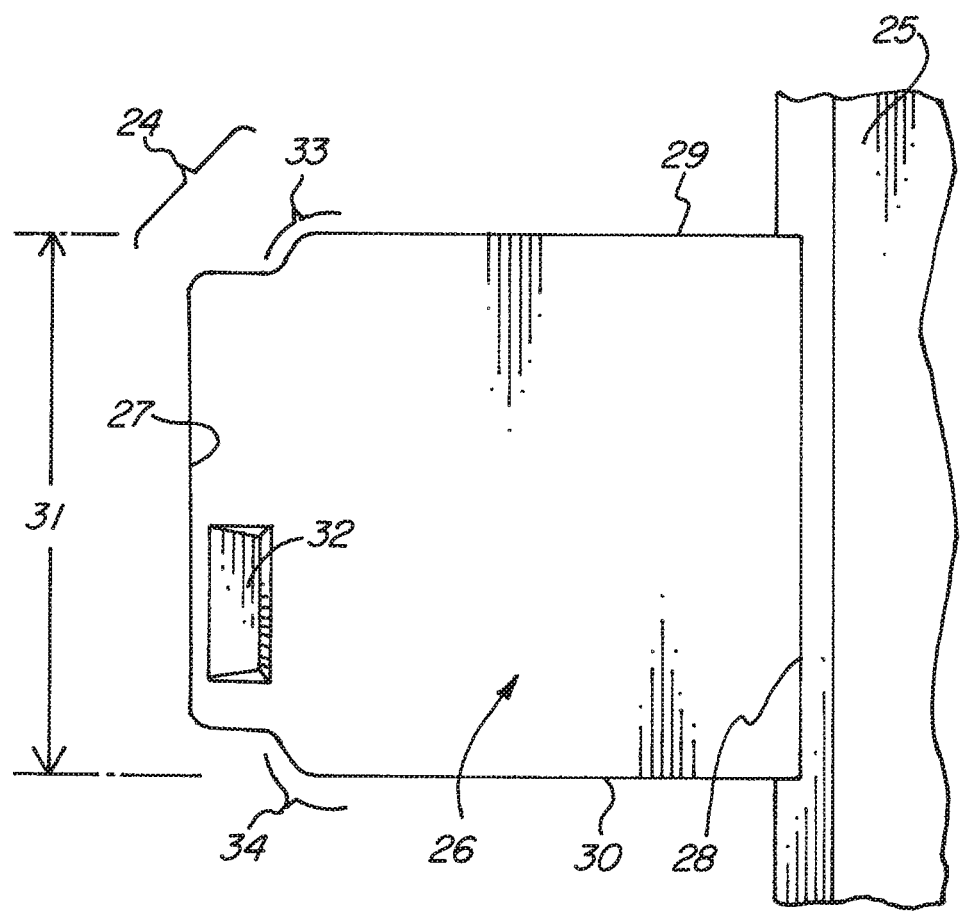
FIG. 3 is a side view of a male joint element according to aspects of the invention.

FIG. 3 illustrates a view of a male element 24 of a slide-and-lock joint according to aspects of the invention. Male element 24 is a counterpart to female element 1 (FIGS. 1 and 2). Male element 24 extends from a second blow molded part 25 and includes a front edge 28 back edge 27 left edge 29 and right edge 30, as well as a bottom surface 26. Bottom width 31 is measured from left edge 29 to right edge 30 at bottom surface 26. A top surface (not shown) has an area less than that of bottom surface 26. A top width (not shown) measured from left edge 29 to right edge 30 at the top surface (not shown) that is less than bottom width 31, such that the difference in width forms protrusions 33 and 34, and such that male element 24 describes a modified dovetail tenon in general shape, and serves this function mechanically.

Protrusions 33 and 34 complement undercuts 22 and 23 of female element 1 (FIGS. 1 and 2) in shape.

Locking barb 32 is disposed on bottom surface 26 such that it complements the corresponding receptacle 16 (FIG. 1) of female element 1 (FIGS. 1 and 2) in location and dimensions. In various embodiments, locking barb 32 may be beveled or tapered to complement ramp 15 (FIG. 1) and/or to facilitate easy assembly with female element 1 (FIGS. 1 and 2).

Figure 4A:
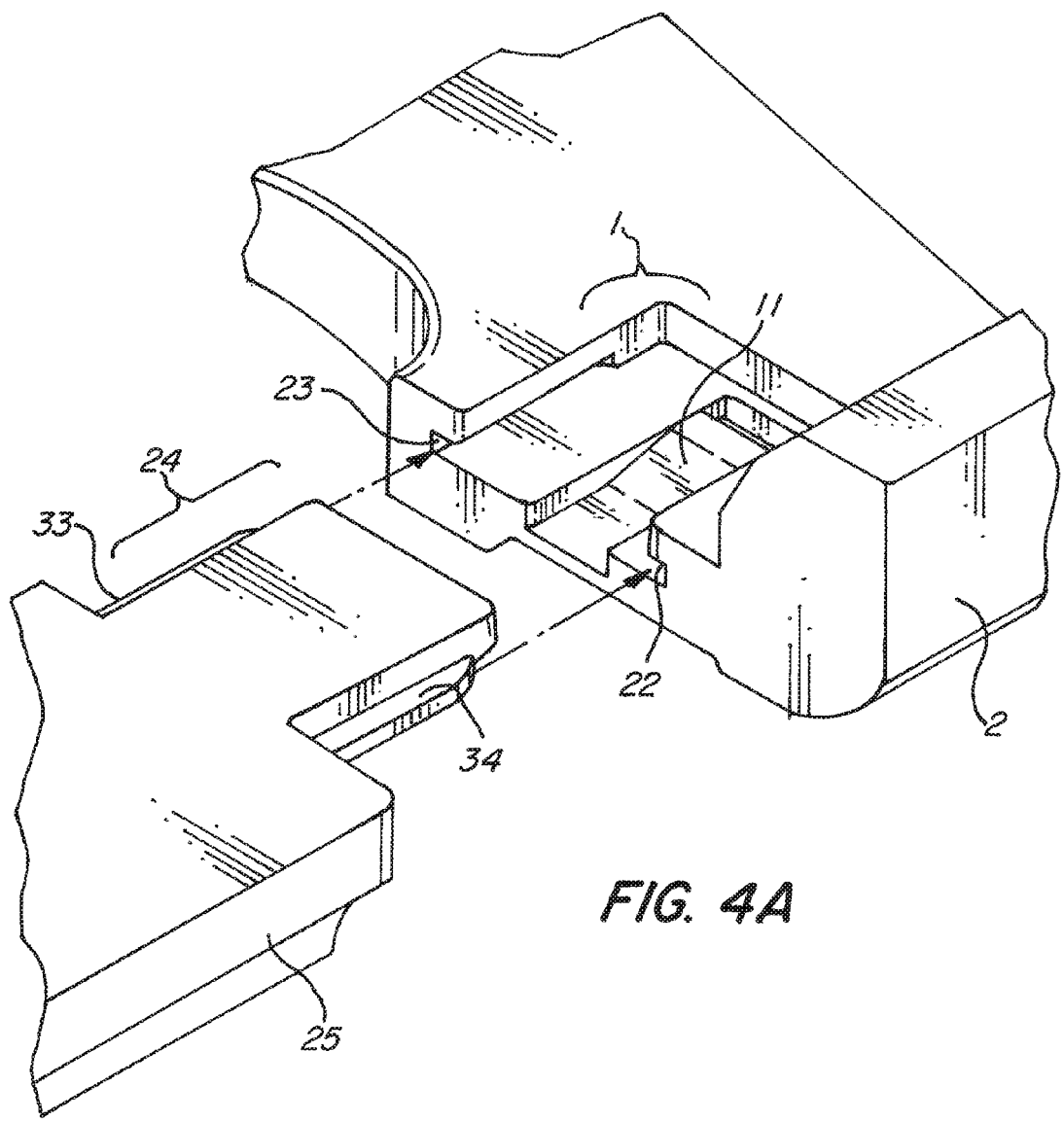
FIG. 4A is an exploded view of an assembly of a male joint element and a female joint element according to the invention.

FIGS. 4A and B illustrate an exploded view and an assembled view of an example assembly of blow molded parts according to the invention. To connect blow molded parts 2 and 25, male element 24 is inserted into female element 1 such that protrusions 33 and 34 engage with undercuts 22 and 23, and such that locking barb 32 (FIGS. 1-3) engages with ramp 11. As male element 24 is inserted into female element 1, the gradual shallowing of ramp 15 exerts pressure on locking barb 32 such that these components undergo a substantially elastic deformation. When male element 24 has been inserted to a depth where locking barb 32 (FIG. 3) can engage with receptacle 16 (FIGS. 1-2), locking barb 32 (FIG. 3) snaps into engagement. Optionally, this abrupt engagement provides tactile and/or auditory feedback, confirming proper assembly of the joint (not shown). The resulting combination of engagements between the surfaces of the male and female elements when assembled can firmly but removably assemble blow molded parts 2 and 25 one to the other.

Figure 5:
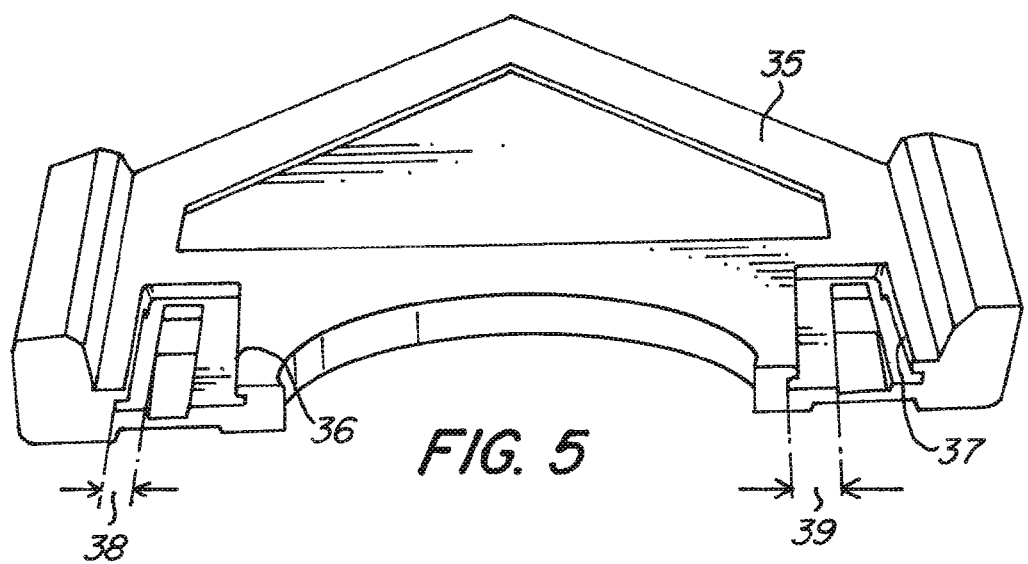
FIG. 5 is a view of a blow molded part having two female joint elements according to embodiments of the invention.

FIG. 5 illustrates a blow molded part 35 having two female joint elements 36, 37 according to embodiments of the invention, each including an offset distance 38, 39, and each substantially similar to the female element 1 as described with respect to FIGS. 1 and 2. Female joint element 36 differs from female joint element 37 only in that offset distance 38 is different than offset distance 39, such that a corresponding male joint element for each (not shown) is incompatible with the other. In this way, female joint elements 36 and 37 retain substantially the same mechanical properties while ensuring mutual incompatibility. This can have the advantages of ensuring proper assembly and simplifying design and manufacture.

Figure 6:
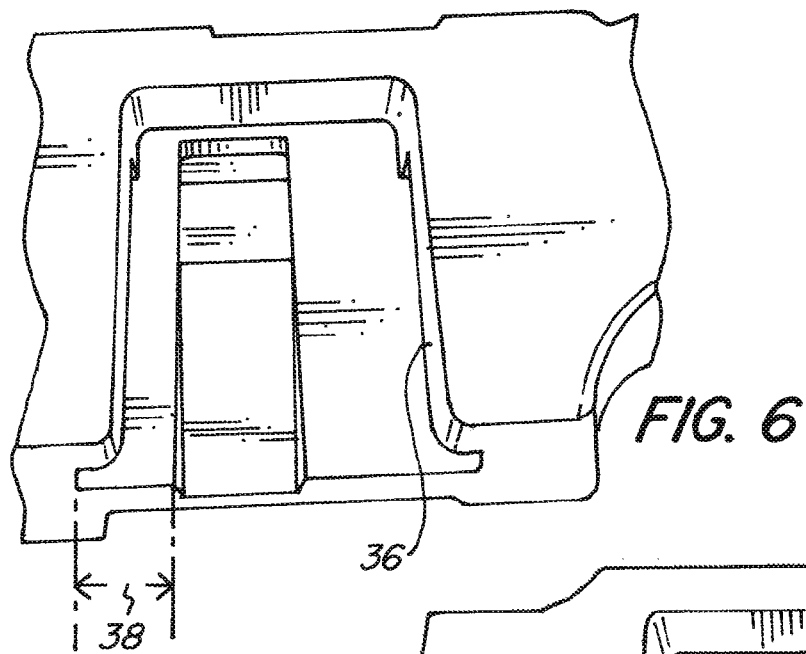
FIG. 6 is a view of a female joint element according to aspects of the invention.
Figure 7:
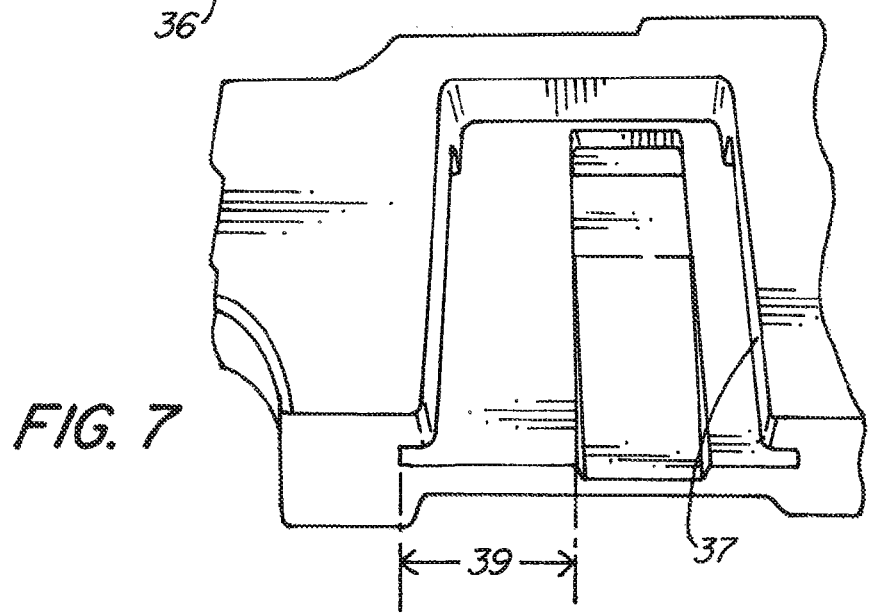
FIG. 7 is view of a different female joint element according to aspects of the invention.

FIGS. 6 and 7 are detail views of female joint elements 36 and 37 showing mutually incompatible offset distances 38 and 39. It should be understood that other variations in the dimensions and alignments of the ramp and receptacle elements can also be used to ensure mutual incompatibility (not shown).

Figure 8:
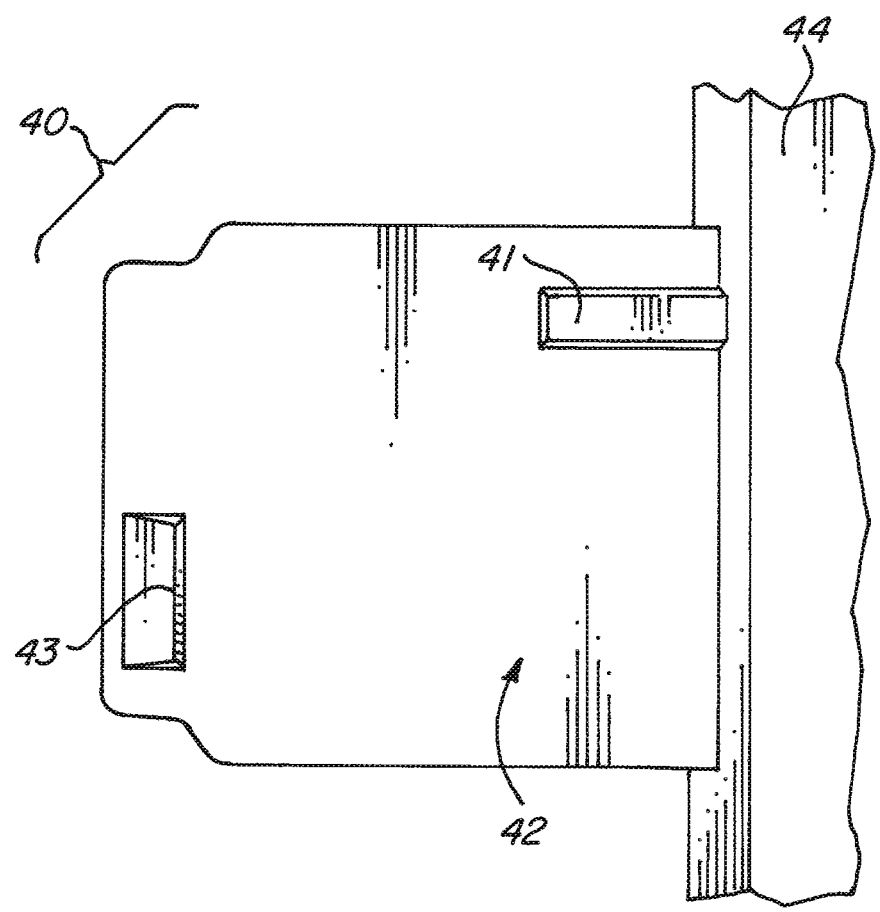
FIG. 8 is a view of a male joint according to aspects of the invention.

FIG. 8 illustrates a top view of a male element 40 of a slide-and-lock joint according to another embodiment of the invention. Male element 40 is similar to male element 24 (described above with respect to FIG. 3) except that male element 40 includes stopper 41. Stopper 41 is disposed on and raised from a bottom surface 42. Stopper 41 is shaped and positioned on bottom surface 42 in such a way as to prevent full insertion of male element 40 into an otherwise corresponding female element (not shown) that does not contain a complimentary notch feature (not shown) which would allow stopper 41 to pass. When it is blocked, stopper 41 prevents engagement of locking barb 43, and thus prevents improper assembly of blow molded part 44.

The addition of stopper 41 provides an additional axis of variability among various joints of an assembly (not shown) which can have the advantage of further helping to ensure exclusive compatibility with a specific male counterpart (not shown) while maintaining the mechanical characteristics of the dovetail joint among the various instantiations (not shown). This can have the advantages of further ensuring proper assembly and further simplifying design and manufacture.

Figure 9:
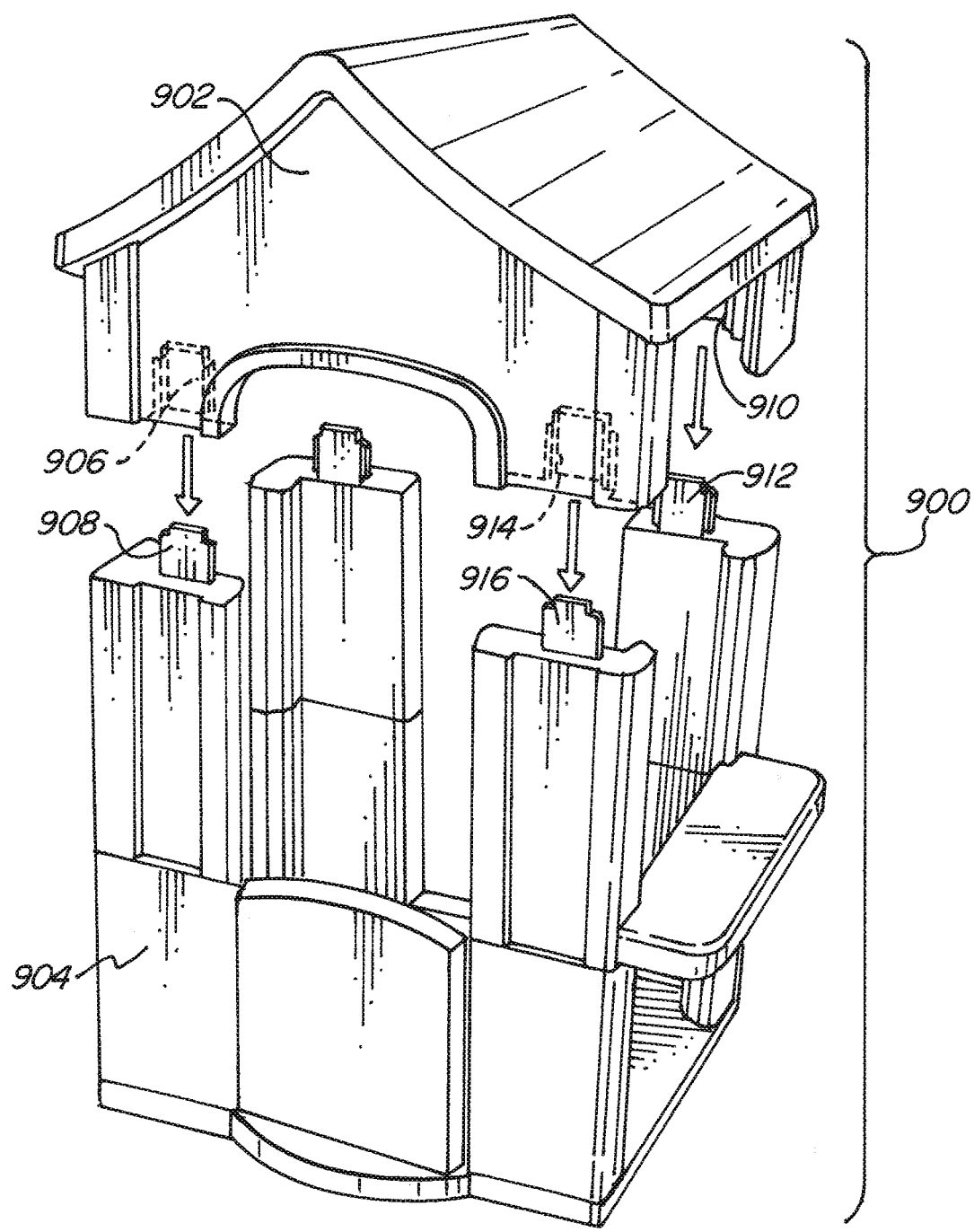
FIG. 9 is an exploded view of a toy house according to aspects of the invention.

FIG. 9 illustrates a toy house 900, which is an example assembly of blow-molded plastic parts according to aspects of the invention.

Toy house 900 is an assembly of blow molded part 902 and blow molded part 904. Blow molded part 902 comprises female joint elements 906, 914, 910. Blow molded part 904 comprises male joint elements 908, 916, 912.

Figure 4B:
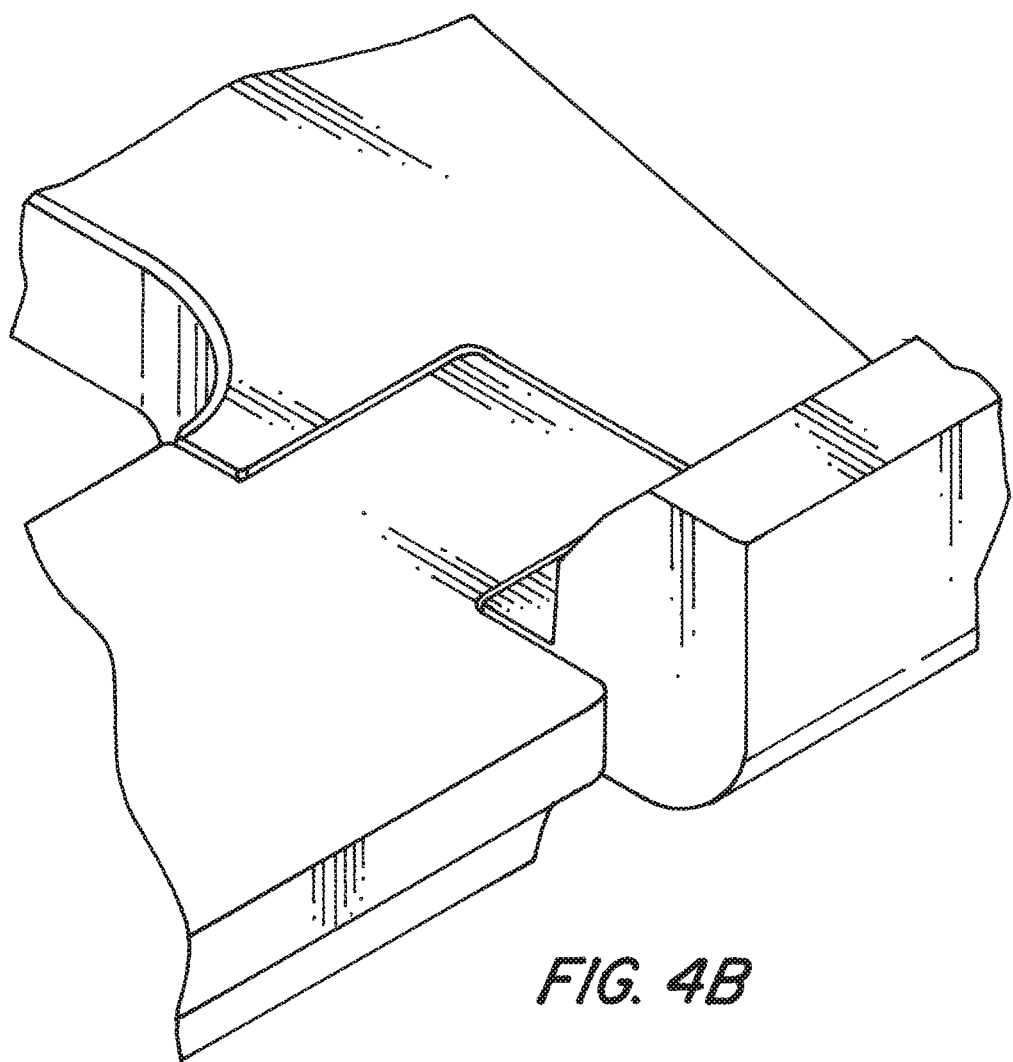
FIG. 4B is an assembled view of an assembly of the male joint element and female joint element shown in FIG. 4A according to the invention.

To assemble blow molded part 902 with blow molded part 904, male joint elements 908, 916, 912 are inserted into female joint elements 906, 914, 910, respectively. These male and female joint elements assemble in substantially the same manner described with respect to FIGS. 4A and 4B. Each male joint element 908, 916, 912 is compatible only with its corresponding female joint element 906, 914, 910, respectively.

Female joint elements 906, 914, 910 each have a structure substantially similar to female element 1 (FIG. 1), female joint element 36 (FIGS. 5 and 6), or female joint element 37 (FIGS. 5 and 7). Each of female joint elements 906, 914, 910 has an offset similar to offset 38 or 39 (FIGS. 5, 6, 7) which is different from the offset of each other female joint element 906, 914, 910.

Similarly, male joint elements 908, 916, 912 each have a structure substantially similar to male element 24 (FIG. 3) or male element 40 (FIG. 8). Each of male joint elements 908, 916, 912 has a locking barb similar to locking barb 32 (FIG. 3) which complements only the offset of the corresponding female joint element 906, 914, 910.

The incompatibility among each of the joints has the advantage of ensuring that blow molded part 902 and blow molded part 904 can only be assembled in the correct orientation, preventing improper assembly of the toy house while permitting each joint to retain substantially the same mechanical properties.

Figure 10:
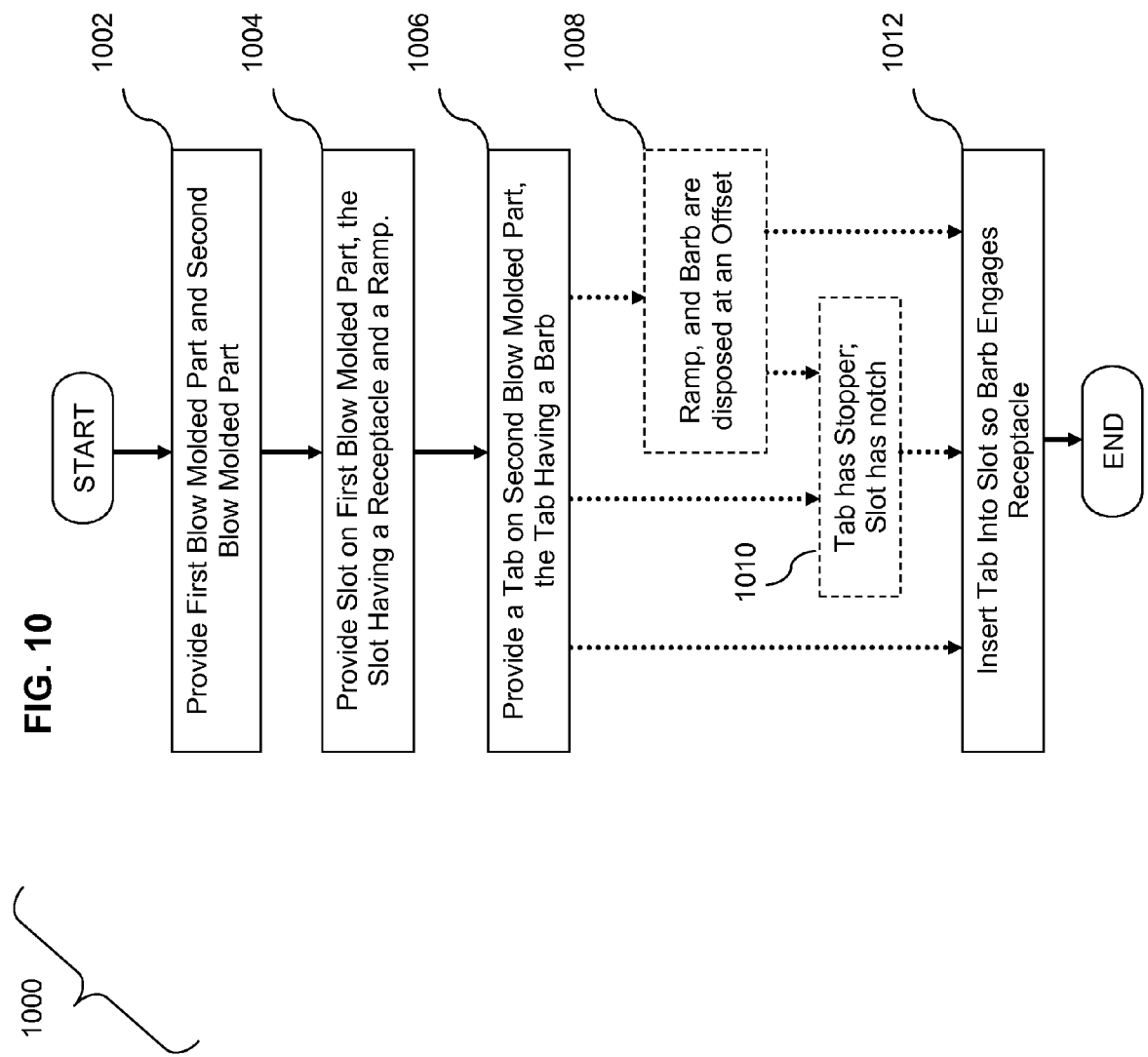
FIG. 10 is a flowchart illustrating an example method according to the invention.

FIG. 10 is a flowchart illustrating a method 1000 according to the invention.

In a step 1002, a first blow molded part and a second blow molded part are provided.

In a step 1004, a slot is provided on the first blow molded part. The slot has a receptacle and a ramp disposed within the slot, the ramp extending and shallowing from the insertion point toward the receptacle, the slot having at least one slide engagement recess.

In a step 1006, a tab is provided on the second blow molded part. The tab has a barb and at least one slide engagement protrusion.

In an optional step 1008, the ramp is of a lesser width than the slot, and the barb is of a width corresponding to the width of the ramp, wherein the ramp is disposed at a ramp offset from a side of the slot, and the barb is disposed at a barb offset from a side of the tab corresponding to the ramp offset.

In an optional step 1010, a stopper is provided on the tab, and a notch is provided within the slot, the stopper having a stopper width and a stopper offset from a side of the tab, and the notch having a notch width corresponding to the stopper width and a notch offset from a side of the slot corresponding to the stopper offset, the stopper preventing full insertion of the tab into another slot that is not provided with a notch having a width and offset that are complimentary to the stopper.

In a step 1012, the tab is inserted into the slot such that the slide engagement protrusions engage the slide engagement recesses and the barb begins to engage the ramp, sliding up the ramp toward the receptacle, the barb finally engaging with the receptacle, retaining the tab within the slot.

It should be clear that the invention can be practiced with all manner of objects and structures which can be assembled from blow-molded plastic parts such as boxes, containers, tables, chairs, packages, carrying cases, enclosures, wheels, toys, and the like.

Although the invention has been described with reference to a particular arrangement of parts, features and the like, these are not intended to exhaust all possible arrangements or features, and indeed many modifications and variations will be ascertainable to those of skill in the art.

What is claimed is:

1. A method of connecting blow molded parts, comprising the steps of:
   providing a first blow molded part and a second blow molded part;
   providing a slot formed on the first blow molded part, the slot comprising a receptacle and a ramp, the slot having first and second ends and two sides wherein the first end defines an opening of the slot and the ramp extends from the first end towards the second end and the ramp is recessed into a wall of the slot;
   providing a tab and a barb formed in the tab, the barb and tab formed on the second blow molded part;
   wherein the ramp is disposed at a ramp offset from one of the two sides of the slot, and the barb is disposed at a barb offset from a side of the tab corresponding to the ramp offset;
   inserting the tab into the slot, such that the barb engages the receptacle; and
   providing a protrusion extending from the lab;
   wherein at least one of the two sides includes a sidewall flange and a recess, the recess located between the wall of the slot and the sidewall flange and the protrusion disposed on the tab such that insertion of the tab into the slot causes the protrusion to be located at least partially in the recess and between the sidewall flange and the wall of the slot.

2. The method of claim 1 wherein the wall is defined between the first and second ends and the two sides.

3. The method of claim 1 further comprising:
providing two protrusions extending from the tab, a first one of the two protrusions extending from a first side of the tab, a second one of the two protrusions extending from a second side of the tab;
wherein each of the two sides of the slot includes a sidewall flange and a recess, the recess located between the wall of the slot and the sidewall flange and the two protrusions disposed on the tab such that insertion of the tab into the slot causes the each of the two protrusions to be located at least partially in one of the recesses and between one of the sidewall flanges and the wall of the slot.

4. The method of claim 1 further comprising:
engaging the barb with the ramp prior to the barb engaging the receptacle.

5. The method of claim 4 further comprising:
sliding the barb up the ramp toward the receptacle during insertion of the tab into the slot such that a pressure between the tab and the slot increases until the barb reaches the receptacle, whereupon the barb engages the receptacle, causing a reduction in the pressure.

6. The method of claim 1, wherein engaging the barb with the receptacle is perceptible audibly or tactilely.

7. The method of claim 1 further comprising:
providing a stopper on the tab, and providing a notch within the slot;
the stopper comprising a stopper width and a stopper offset from a side of the tab, and the notch comprising a notch width corresponding to the stopper width and an offset from a side of the slot corresponding to the stopper offset;
the stopper preventing full insertion of the tab into slots that are not provided with a notch comprising a width and offset that are complimentary to the stopper.

8. The method of claim 1, wherein the ramp extends and shallows from the first end toward the receptacle.

9. The method of claim 1, wherein the ramp is of a lesser width than the slot, and the barb is of a width corresponding to the width of the ramp.

10. The method of claim 1 wherein the ramp offset is measured from the closest one of the two sides.

11. A slide-lock joint system comprising:
a first blow molded part and a second blow molded part;
a slot formed on the first blow molded part, the slot comprising a receptacle and a ramp, the slot having first and second ends and two sides wherein the first end defines an opening of the slot and the ramp extends from the first end towards the second end and the ramp is recessed into a wall of the slot;
a tab formed in the second blow molded part;
a barb formed in the second blow molded part within the tab;
the tab fitting the slot such that the barb engages the receptacle;
a stopper on the tab and a notch within the slot;
the stopper comprising a stopper width and a stopper offset from a side of the tab, and the notch comprising a notch width corresponding to the stopper width and a notch offset from a side of the slot corresponding to the stopper offset;
wherein the stopper prevents full insertion of the tab into an otherwise identical other slot that is not provided with a notch comprising a width and offset that are complimentary to the stopper.

12. The slide-lock joint system of claim 11 wherein the ramp is disposed at a ramp offset from a side of the slot, and the barb is disposed at a barb offset from a side of the tab corresponding to the ramp offset.

13. The slide-lock joint system of claim 12, further comprising:
a second tab on the second blow molded part or on a different blow molded part, the second tab comprising a second barb;
wherein the second barb is disposed at a second barb offset from a side of the second tab that is different from the barb offset; and,
wherein the second tab is incompatible with the slot.

14. The slide-lock joint system of claim 11 wherein the wall is defined between the first and second ends and the two sides.

15. The slide-lock joint system of claim 11, further comprising:
a second slot on the first blow molded part or on a different blow molded part, the second slot comprising a second ramp and the second slot extending from a third end towards a fourth end and having two sides wherein the second ramp is open at the third end and extends towards the fourth end;
wherein the second ramp is disposed at a second ramp offset from a side of the second slot that is different from the ramp offset; and,
wherein the second slot is incompatible with the tab.

16. The slide-lock joint system of claim 11, further comprising:
at least one protrusion disposed on the tab, and at least one recess disposed within the slot, such that the protrusion engages the recess when the tab is inserted into the slot;
wherein the protrusion, the recess, the barb, and the receptacle retain the tab within the slot.

17. The slide lock joint system of claim 11, wherein insertion of the tab into the slot will increase a pressure between the tab and the slot as the tab is inserted until the barb reaches the receptacle.

18. The slide lock joint system of claim 17, wherein engaging the barb with the receptacle causes a reduction in the pressure between the tab and the slot.

19. The slide lock joint system of claim 11, wherein engaging the barb with the receptacle is perceptible audibly or tactilely.

20. The slide-lock joint system of claim 11, wherein the ramp extends and shallows from the first end of the slot towards the receptacle, the ramp aligning and engaging slidably with the barb.

21. The slide-lock joint system of claim 11, wherein the ramp is of a lesser width than the slot, and the barb is of a width corresponding to the width of the ramp.

22. A method for connecting blow molded parts, comprising the steps of:
providing a first blow molded part and a second blow molded part;
providing a slot formed on the first blow molded part, the slot comprising a receptacle and a ramp, the slot having first and second ends and two sides wherein the first end defines an opening of the slot and the ramp extends from the first end towards the second end and the ramp is recessed into a wall of the slot;

providing a tab formed on the second blow molded part, the tab comprising a barb and at least one protrusion, wherein the barb is formed in the tab and the barb and tab are formed in the second blow molded part;

beginning to insert the tab into the slot, such that the barb begins to engage the ramp, and the at least one protrusion engages slidably with a recess in at least one of the two sides of the slot;

continuing to insert the tab into the slot such that the barb slides along the ramp toward the receptacle; and, completing insertion of the tab into the slot such that the barb engages the receptable and wherein the engagement is perceptible audibly or tactilely;

providing a stopper on the tab, and providing a notch within the slot, the stopper comprising a stopper width and a stopper offset from a side of the tab, and the notch comprising a notch width corresponding to the stopper width and a notch offset from a side of the slot corresponding to the stopper offset, the stopper preventing full insertion of the tab into another slot that is not provided with a notch comprising a width and offset that are complimentary to the stopper.

23. The method of claim 22, wherein the tab is retained within the slot by the at least one recess, the at least one protrusion, the barb, and the receptacle.

24. The method of claim 22, wherein the ramp is of a lesser width than the slot, and the barb is of a width corresponding to the width of the ramp, and wherein the ramp is disposed at a ramp offset from one of the two sides of the slot, and the barb is disposed at a barb offset from a side of the tab corresponding to the ramp offset.

25. The method of claim 22 wherein the notch is recessed into the wall of the slot.

26. An assembly of blow-molded parts comprising:
at least two blow molded parts;
at least two slots, each slot formed on one of the blow molded parts, each slot having first and second ends and two sides wherein the first end of each slot defines an opening;
a ramp and a receptacle formed in each slot, each ramp extending from the first end towards the second end of its respective slot, each ramp recessed into a wall of its respective slot;
at least two tabs, each integrally formed on one of the blow molded parts; a barb integrally formed in each of the at least two tabs, each tab comprising a tab side;
each ramp disposed at a ramp offset from one of the two sides of its respective slot, the ramp offset of at least one of the at least two slots is different from the ramp offset of at least one other of the at least two slots;
each barb is disposed at a barb offset from the tab side, the barb offset of one of the at least two tabs is different from the barb offset of at least one other of the at least two tabs;
a protrusion extending from at least one of the tabs on one of the blow molded parts;
wherein at least one of the two sides of at least one of the slots on another one of the blow molded parts includes a sidewall flange and a recess, the recess located between the wall of the slot and the sidewall flange and the protrusion disposed on the at least one tab such that insertion of the tab into the at least one slot causes the protrusion to be located at least partially in the recess and between the sidewall flange and the wall of the slot.

27. The assembly of claim 26 wherein the assembly is a toy house, box, container, table, chair, package, carrying case, enclosure, wheel, or toy.

28. The assembly of claim 26 further comprising:
two protrusions extending from each tab;
wherein each of the two sides of the each slot includes a sidewall flange and a recess, the recess located between the wall of the slot and the sidewall flange and the two protrusions disposed on the tab such that insertion of the each tab into its respective slot causes:
a first one the two protrusions to be located at least partially in one of the recesses and between one of the sidewall flanges and the wall of the respective slot; and
a second one the two protrusions to be located at least partially in another one of the recesses and between another one of the sidewall flanges and the wall of the respective slot.

29. The assembly of claim 26 further comprising:
a stopper on each tab, and a notch within the each slot;
each stopper comprising a stopper width and a stopper offset from a side of the corresponding tab, and each notch comprising a notch width corresponding to one of the stopper widths and an offset corresponding to one of the stopper offsets such and one of the stopper width or stopper offset of one of the tabs is different from another stopper width or stopper offset of another one of the tabs.

30. The assembly of claim 26 wherein the ramp offset is measured from the closest one of the two sides.

* * * * *